United States Patent [19]

Nejedly et al.

[11] 4,217,569
[45] Aug. 12, 1980

[54] THREE DIMENSIONAL STRAIN GAGE TRANSDUCER

[75] Inventors: Peter Nejedly, Ottawa; Douglas W. Whitfield, Stittsville, both of Canada

[73] Assignee: Atomic Energy of Canada Limited, Ottawa, Canada

[21] Appl. No.: 5,802

[22] Filed: Jan. 23, 1979

[30] Foreign Application Priority Data

Oct. 18, 1978 [CA] Canada ................................. 313729

[51] Int. Cl.² ............................................. G01L 1/22
[52] U.S. Cl. .................................... 338/2; 73/133 R; 73/141 A; 244/236
[58] Field of Search ......................... 338/2; 244/83 R; 73/133 R, 141 A

[56] References Cited

U.S. PATENT DOCUMENTS

| 2,762,234 | 9/1956 | Dodd | 244/83 R X |
| 3,447,766 | 6/1969 | Palfreyman | 244/83 R |
| 3,676,818 | 7/1972 | Oliver | 338/2 |
| 3,729,990 | 5/1973 | Oliver | 73/133 R |
| 4,127,841 | 11/1978 | Kato et al. | 338/128 |

Primary Examiner—C. L. Albritton
Attorney, Agent, or Firm—Lewis H. Eslinger

[57] ABSTRACT

There is provided a single lever joystick having movement in X and Y directions and rotation about a further axis Z wherein axes X, Y and Z are substantially perpendicular. The joystick can be moved in all three senses at the same time. Movement of the joystick is resiliently restrained to a selected neutral position. Resiliency is obtained from substantially plate-like springy members to which are attached strain gauges. Each of the strain gauges is capable of producing a continuously variable electrical resistance output which is a function of the displacement of the joystick from its neutral position.

5 Claims, 5 Drawing Figures

THREE DIMENSIONAL STRAIN GAGE TRANSDUCER

This invention relates to a three dimensional strain gauge transducer which has particular, but not exclusive, use with the control of movements in mechanism which has an element or elements which is or are selectively moveable in a two dimensional plane and rotatable about a given axis. The invention will be described with particular reference to medical diagnostic or therapy equipment. However, as will be appreciated by those skilled in the art, the invention has utility in the control of cranes, hoists, logging equipment and production machinery.

In some of the above mentioned applications, particularly with therapy equipment, differences between one version of a machine or between different types of machine, manufacturers have traditionally provided different controls. The invention to be described is particularly well suited for use with many different machines and to satisfy various market needs.

By way of introduction, a hand control which incorporates a three dimensional strain gauge transducer was considered to require the majority, if not all, of the following features:
 (a) All motions capable of simultaneous activation.
 (b) All speeds to be continuously variable.
 (c) Function controls grouped in universal three dimensional joystick modules.
 (d) Providing parallel readouts.
 (e) Having standardized emergency and deadman switches.
 (f) Having rugged construction.
 (g) Having a strong overhead suspension.

It was felt that such a product would exceed market requirements thus not only improving the manufacturer's reputation but also its profitability by reducing the development effort on seemingly endless variety of incremental product improvements and interim solutions.

A strain gauge transducer offers an improvement over the prior art such as potentiometeric transducers in every area especially in size and reliability.

It is an object of one feature of the invention to provide a three dimensional strain gauge transducer wherein all motions are capable of simultaneous activation and all electrical outputs are continuously variable.

It is an object of another feature of the invention to provide a three dimensional strain gauge transducer where function controls are grouped in universal three dimensional joystick modules comprising a basic building block for most present and future control requirements.

It is an object of another feature of the invention to provide a three dimensional strain gauge transducer having rugged construction, and utilizing standardized emergency, deadman and function enable switches comprising a hand control assembly.

The invention will now be described with reference to the following drawings, in which.

Figure 1:
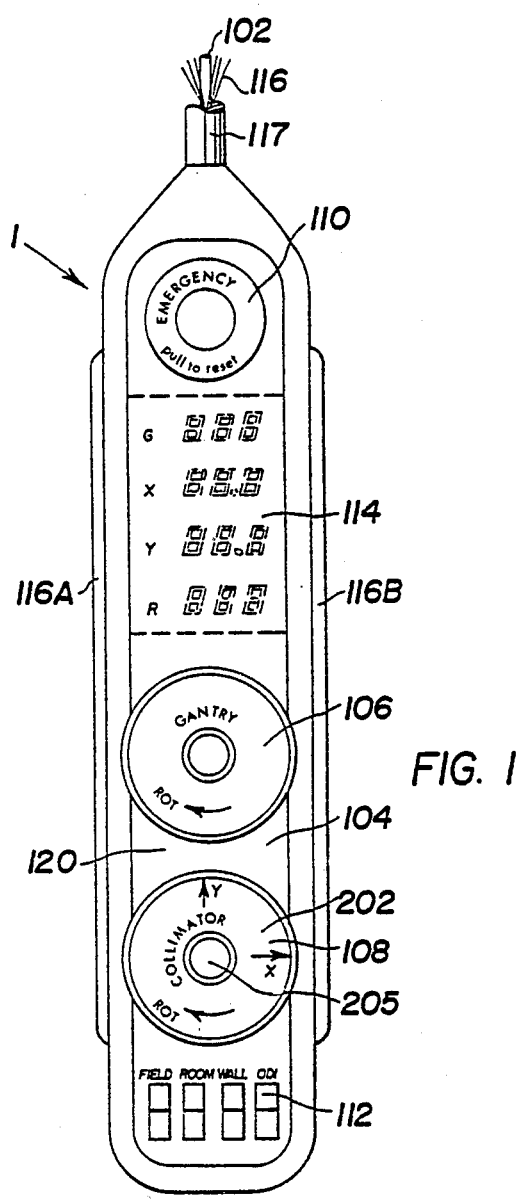
FIG. 1 is a full-size view of a hand control.

Referring now to FIG. 1 of the drawings, a hand control comprises a hollow body member 1 which may be suspended by a mechanical cable 102. The body includes a top-plate 120 upon which are mounted a gantry control 106, a collimator control 108, an emergency stop button 110 and various switches 112. As an example, the collimator control 108 is shown as having a circular configuration. The body member 1 further includes a numerical readout panel 114 and a pair of deadman switches, 116A and 116B, both of which switches must be fully and simultaneously depressed to operate the hand control. The cable 102 may be encased in a sleeve 117 together with various electrical conductors 116 and the mechanical cable 102.

The construction of the gantry and collimator controls will now be described with reference to FIGS. 2, 3, 4 and 5.

The collimator control 108 will be described since this control has X and Y elements together with a rotational element R. As an alternative, the collimator control 202 is illustrated as having a square configuration.

Figure 2:
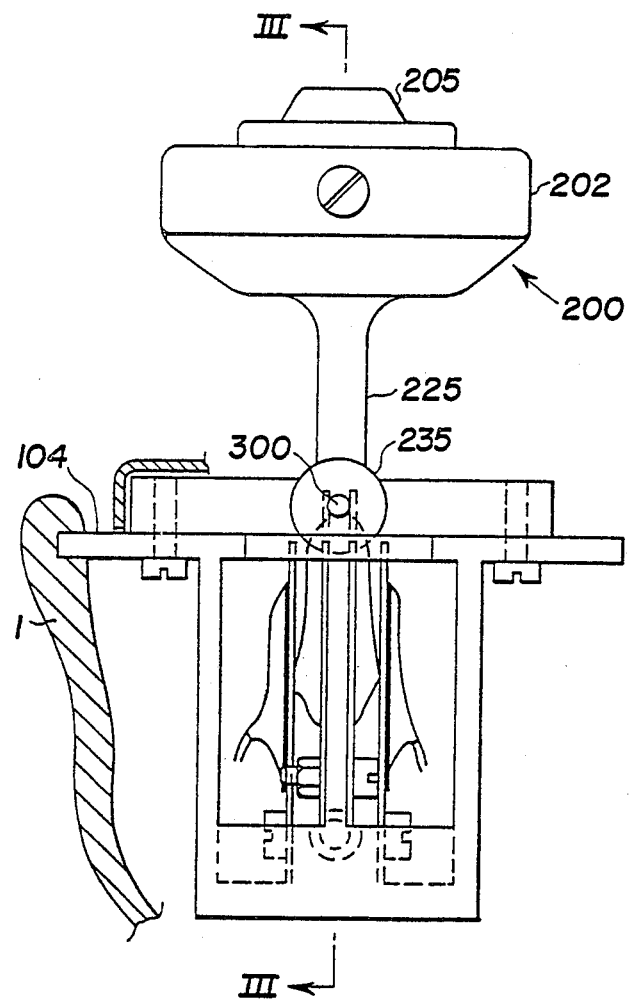
FIG. 2 is an end view, partly in section, of a joystick module.
Figure 3:
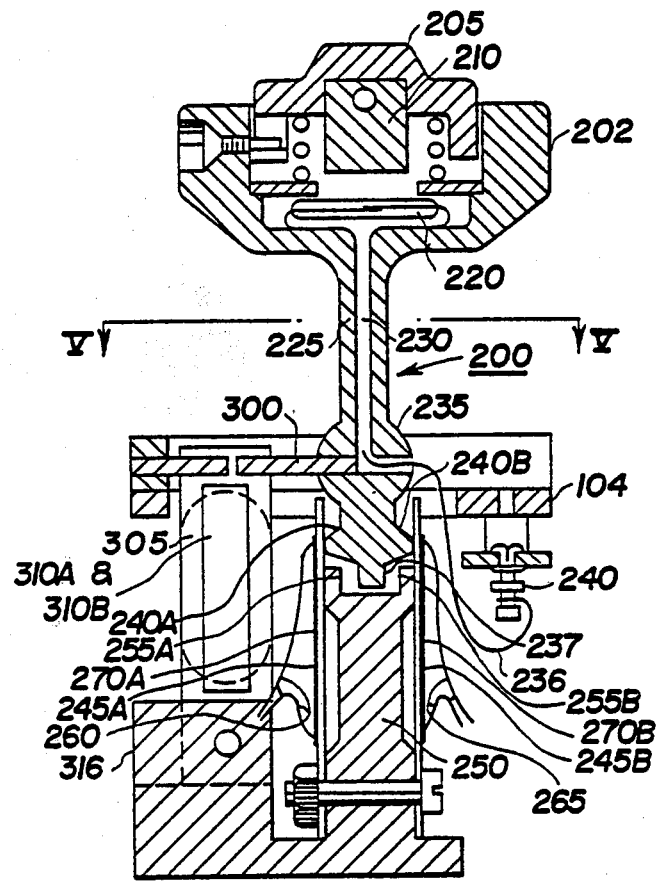
FIG. 3 is a side view of the joystick shown in FIG. 2 taken along line III—III thereof.
Figure 4:
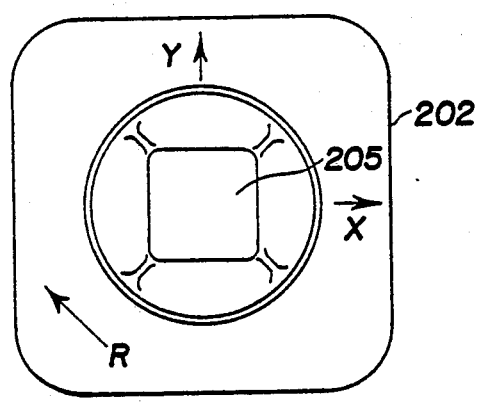
FIG. 4 is a top view of the joystick shown in the previous figures.
Figure 5:
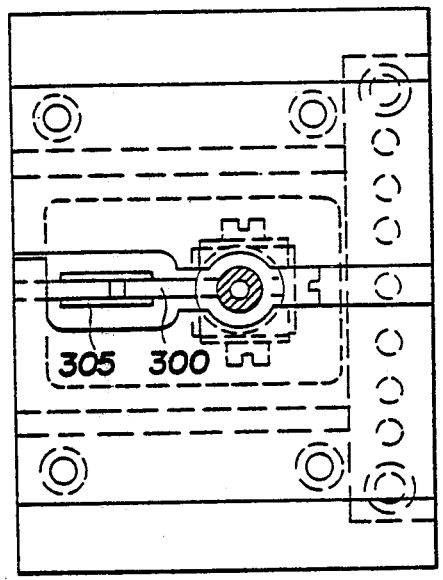
FIG. 5 is a plan view, partly in section, taken along the line V—V in FIG. 3.

Referring now to FIGS. 2 and 3, a handle 200 has a mushroom-shaped head 202 which houses a spring-loaded function enable button 205. The interior surface of the stop button 205 is recessed to receive and hold a magnet 210 which actuates a reed relay 220 mounted on the bottom surface of the interior of the head 202. The shank 225 is hollow to allow electrical conductors to be threaded therethrough. For example, conductor 236 is attached to an electrically isolated terminal 240. The base of the shank 225 is formed into a ball 235 which cooperates with bearing means, not shown, on the top plate 104, to permit movement of the head 202 in X and Y directions relative to the top plate 104. The same ball joint 235 also permits limited rotational movement of the head in substantially the same plane as X and Y. FIG. 4 shows the relative directions of X and Y and rotation R by inscriptions thereon. The handle shank 200 extends below the ball 235 and is terminated by a pair of outward facing lobes 240A and 240B each of which abut an associated spring member 245A and 245B. The spring members 245A and 245B are rigidly mounted on an upstanding post 250 which is slotted at the top thereof to form stops 255A and 255B against which an extension 237, at the lower end of the handle 200, may abut. Thus, when the handle 200 is moved in a +X direction lobe 240A abuts and deforms spring members 245A, and when the handle 200 is moved in a −X direction lobe 240A abuts and deforms spring members 245B. On each respective spring member 245A and 245B are mounted strain gauges 270A and 270B. Stressing of the respective strain gauges 270A and 270B produces resistance changes therein which are utilized by suitable circuitry. Similarly, there are provided outward facing pairs of lobes, springs and strain gauges disposed in a plane which is perpendicular to X-X pairs so as to provide input to similar circuitry for control in the Y-Y directions.

Extending laterally from the ball 235 there is disposed a rod 300 which interacts with the upper end of a spring member 305 upon which are mounted strain gauge elements 310A and 310B. The lower end of the spring member 305 is rigidly mounted in a slot in an upstanding internal rib 316 on the body member 1.

The lobes and strain gauges for controlling movement in the X-X and Y-Y directions are suitably proportioned so that the lobes continue to abut the spring members, although not necessarily deforming the latter, at all times, and particularly when the handle has been turned exclusively to impart a rotational control function.

Referring again to FIG. 1, it will be seen that when used with therapy equipment the unit includes two independent controls. The lower unit 108 includes X-X, Y-Y and rotational strain gauge elements, hereinbefore described in detail, for the control of a collimator. The gantry control 106 may include any or all of the aforementioned strain gauge elements, or be limited to a single rotational strain gauge element.

In use, a therapy head will be positioned on the gantry, relative to a patient, by actuation of the gantry control 106. Associated circuitry, not shown, provides feedback position signals to operate the gantry numeric display at G on the panel 114. A collimator on the same therapy head will then be suitably positioned along the perpendicular axes X and Y by actuation of the collimator control 108 and rotated by means of the same control. The X, Y and R numeric display on panel 114 are similarly operated by feedback signals.

Accidental activation of switch 110 is minimized by its location in the uppermost region on any hand control out of reach of normal control operations. The switch should however, extend beyond the protective rim of the front panel, so that it can be actuated by any part of the hand. The small actuating force enables one-handed operation in hanging configurations.

Electrically, the emergency switch interrupts a 24 V line leading to a power contactor. A minimum requirement for any hand control emergency system is to switch off power to all gantry and therapy couch motors. The main frame, wall, and control room emergency switches switch off power to the entire unit.

Primary deadman switch 116A and 116B function automatically disarms all mechanical motions which are affected by the hand control as soon as the hand control is released. A secondary function automatically transfers control to other parts of the system. In this way "console" buttons on accelerators and hook switches on therapy couches can be eliminated.

The disarming function is preferably accomplished by a solid state relay wired in series with an emergency contactor. In this way reliable and noiseless operation can be achieved.

The mechanical switch implementation with elongated bars with 2 microswitches at opposite ends (the switch contacts are to be wired in series redundant, normally open configuration). The bar design is such that a reasonable compromise must be established between convenient human access and possibility of accidental actuation when lying on, or leaning against physical objects.

It will be understood that the straining of the receptive strain gauges produces a continuously variable electrical resistance output. Further, when all three strain gauges are used, there will be three continuously variable electrical resistance outputs.

One of the advantages of using opposed pair of strain gages, for the respective movements, is that the pairs may be connected in bridge configuration. Such a configuration can be formed as to compensate for temperature variation errors.

The embodiments of the invention in which an exclusive property or privilege is claimed, are defined as follows:

1. A three dimensional strain gauge transducer comprising:
   (a) a body member,
   (b) a joystick pivoted on said body member for limited movement from a neutral position in first and second substantially perpendicular directions and limited rotation about the axis thereof, said first and second directions and said rotation being in relation only to said body member, said joystick having a first end defining a manually operable knob and a second end defining spring engaging means,
   (c) a first pair of spring means engageable and deformable by said engaging means in response to movement in said first direction,
   (d) a second pair of spring means engageable and deformable by said engaging means in response to movement in said second direction,
   (e) a third pair of spring means engageable and deformable by said engaging means in response to said rotation, said first, second and third spring means respectively urging said joystick to said neutral position, and
   (f) associated pairs of strain gauge elements mounted on the first, second and third pairs of springs.

2. A transducer as defined in claim 1, wherein said joystick is pivoted in a spherical bearing member.

3. A transducer as defined in claim 1, where said joystick further includes a function enable button.

4. A transducer as defined in claim 1, wherein said strain gauge elements mounted on each of said springs constitute means for providing continuously variable electrical resistance output for simultaneous three-directional control.

5. A transducer as defined in claim 1, further including pairs of stops associated with each of said pairs of springs to positively define the neutral positions thereof.

* * * * *